United States Patent [19]

Troxell

[11] Patent Number: 4,975,770
[45] Date of Patent: Dec. 4, 1990

[54] METHOD FOR THE ENHANCEMENT OF CONTOURS FOR VIDEO BROADCASTS

[76] Inventor: James D. Troxell, P.O. Box 123, Cuyahoga Falls, Ohio 44222

[21] Appl. No.: 387,230

[22] Filed: Jul. 31, 1989

[51] Int. Cl.⁵ ............................................. H04N 5/272
[52] U.S. Cl. .................................. 358/96; 273/176 F; 273/176 H; 273/DIG. 28; 358/183
[58] Field of Search ................... 358/93, 183, 903, 96, 358/104, 105, 106, 107, 108, 109; 273/176 R, 176 A, 176 AA, 176 AB, 176 F, 176 FA, 176 L, 186, 195 R, 195 A, 195 B; 340/734, 721, 744; 364/522; 356/2, 376, 345, 346, 397

[56] References Cited

U.S. PATENT DOCUMENTS

| | | | |
|---|---|---|---|
| 2,933,008 | 4/1960 | Barnett | 88/14 |
| 3,749,493 | 7/1973 | Macovski | 556/376 |
| 3,762,818 | 10/1973 | Johnson et al. | 356/376 |
| 3,963,866 | 6/1976 | Tanie | 178/7.2 |
| 4,259,589 | 3/1981 | DiMatteo et al. | 356/2 |
| 4,414,565 | 11/1983 | Shanks | 358/89 |
| 4,489,389 | 12/1984 | Beckwith et al. | 364/522 |
| 4,505,478 | 3/1985 | Riethmiller | 273/32 H |
| 4,528,587 | 7/1985 | Jones, Jr. | 358/92 |
| 4,602,286 | 7/1986 | Kellar et al. | 358/22 |
| 4,682,217 | 7/1987 | David et al. | 358/89 |
| 4,703,344 | 10/1987 | Hisano et al. | 358/107 |
| 4,714,319 | 12/1987 | Zeevi et al. | 350/144 |
| 4,802,759 | 1/1989 | Matsumoto et al. | 356/376 |
| 4,805,121 | 2/1989 | Scott et al. | 364/522 |

FOREIGN PATENT DOCUMENTS 0196608 10/1985 Japan ............................... 356/376

Primary Examiner—Howard W. Britton
Assistant Examiner—Michael Lee
Attorney, Agent, or Firm—Renner, Kenner, Greive Bobak, Taylor & Weber

[57] ABSTRACT

A method for enhancing golf green contours for television broadcasts comprises the steps of providing a grid pattern (32) of intersecting parallel lines (38, 39) over the surface of a golf green (10), recording the grid pattern, and broadcasting the grid pattern onto a television screen (33) simultaneously with the broadcast of the golf green during play thereon, whereby contours presented by the green are more clearly depicted by the grid pattern. The method is practiced with relative simple equipment and without interfering with play of the game. A related method can be employed for enhancing contours of other land surfaces for broadcast purposes.

13 Claims, 4 Drawing Sheets

FIG. 3
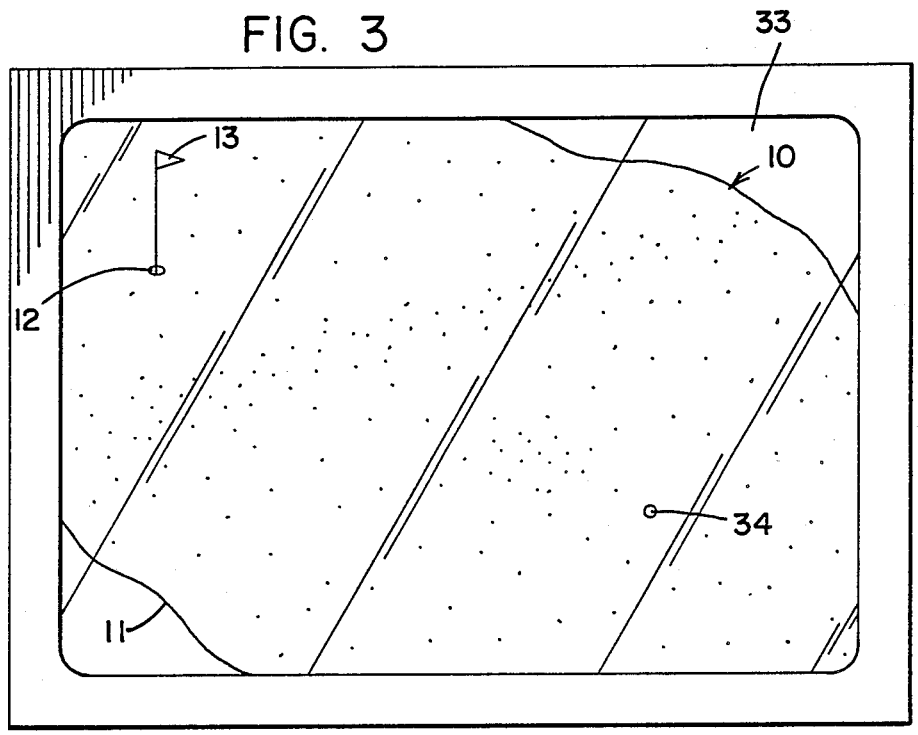
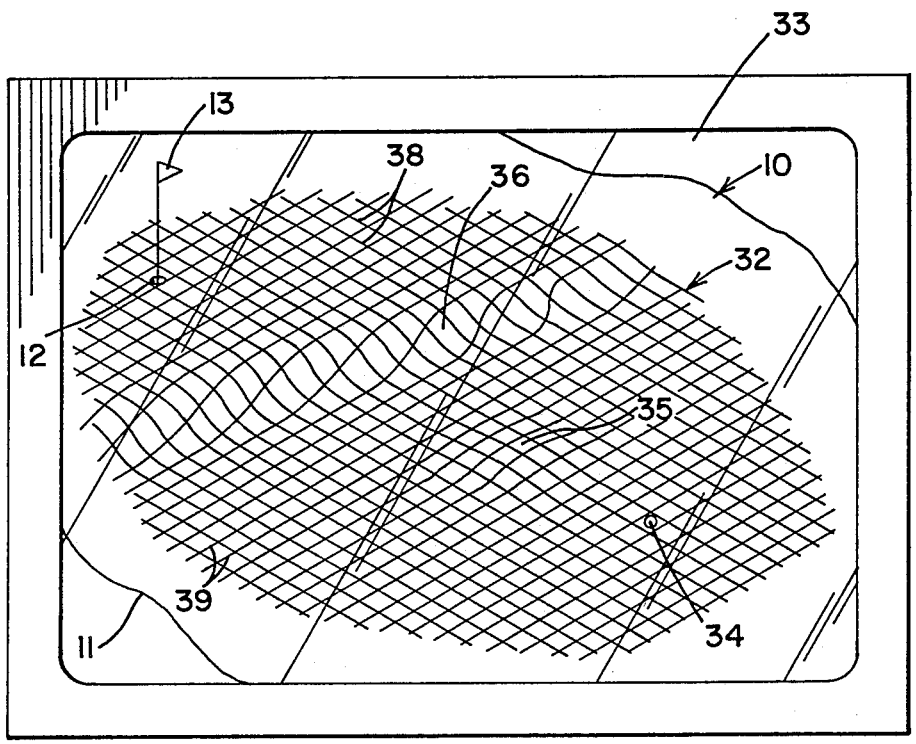
FIG. 4

METHOD FOR THE ENHANCEMENT OF CONTOURS FOR VIDEO BROADCASTS

TECHNICAL FIELD

Professional golf tournaments are frequently televised and reach millions of interested viewers in this country and abroad. As the golfers approach or reach the greens and proceed to putt, the action is televised and recorded by a camera crew that has been previously positioned in a least obstructive manner. While the green is rarely completely flat and may even have severe contours and other surface variations, normal television shots of the golf green and approach areas presents only a flat appearance to the viewer. Hence, viewers are not able to understand why the ball reacts as it does to the approach shot or putt. They expect a straight path between the ball and the hole because of the appearance of the green. Television commentators also try to explain the "break" of the green or the ball but in reality, they need to display the contours in order to allow the viewer a reasonable understanding of the game play.

The method of the present invention will enable a television crew to record and broadcast the contours of the golf green, as well as areas in the immediate vicinity if desired without interference with the players or the interruption of the game. As a result, the television viewer is afforded a spatial interpretation of the actual contours superimposed over the otherwise "flat" appearing green. The method is not limited to golf greens and can be employed with other areas of the course as well as other contours presented in sporting as well as non-sporting events.

BACKGROUND OF THE INVENTION

In order to record and present various topographies to viewers, a number of methods and apparatus are known which digitize information from photographs or process video signals. Exemplary systems are disclosed in U.S. Pat. Nos. 3,963,866; 4,682,217 and 4,805,121. While such techniques are useful for training purposes, the large costs that are incurred do not justify the digital mapping of golf greens.

Other techniques involve methods utilizing multiple cameras such as those described in U.S. Pat. Nos. 4,528,587 and 4,714,319. These are more readily adapted for use with objects rather than land contours, such as golf greens. U.S. Pat. No. 2,933,008 does, however, provide an apparatus involving the use of cameras to obtain contour representations, although the areas covered are photographed aerially.

Finally, at least one patent is known that provides a device for estimating various distances from the lie of the golf ball to the hole which allows the golfer to select proper clubs and other measures within his or her control. The device consists of a booklet which represents each golf hole. Individual sheets are provided with concentric rings or bands which translate into distances to the hole with representations of sand, water, trees and the like, Of course, the device is usable by the player, not a viewer and no means are provided for depicting or correlating the contours of the course.

Thus, the prior art has failed to provide a method for enhancing golf green contours for viewers of television broadcasts.

SUMMARY OF THE INVENTION

It is therefore an object of the present invention to provide a relatively inexpensive method whereby the contours of golf green and the like can be depicted for viewers of television broadcasts.

It is another object of the present invention to provide a method whereby the contours of golf greens are presented by the distortion of intersecting parallel lines projected onto the green in contrast therewith.

It is yet another object of the present invention to provide a method whereby the contours of various golf greens can be depicted and recorded prior to tournament play for simultaneous broadcast during play.

It is still another object of the present invention to provide a method that is readily employed by the camera crew on hand to broadcast the tournament and utilizing some of the same equipment.

It is yet another object of the present invention to provide a method for enhancing the contours of various topographics for viewers of video broadcasts.

These and other objects, together with the advantages thereof over existing methods of broadcasting which shall become apparent from the specification which follows, are accomplished by the invention as hereinafter described and claimed.

In general, the present invention provides a method for enhancing golf green contours for television broadcasts which comprises the step of providing a grid pattern of intersecting parallel lines over the surface of a golf green, recording the grid pattern and broadcasting the grid pattern onto a television screen simultaneously with the broadcast of the golf green during play thereon, whereby contours presented by the green are more clearly depicted by the grid pattern.

A related method for enhancing land contours for video viewing thereof comprises the steps of providing a grid pattern of intersecting parallel lines over the surface desired area of land and broadcasting the grid pattern onto a screen surface, whereby contours presented by the land are more clearly depicted by the grid pattern.

BRIEF DESCRIPTION OF THE DRAWINGS

FIG. 3 is a typical two dimensional view presented by a television screen of the green with a ball on the green;

FIG. 4 is the same view of the green presented by the television screen depicting a view which allows the viewer to appreciate and understand the contours present;

PREFERRED EMBODIMENT FOR CARRYING OUT THE INVENTION

Figure 1:
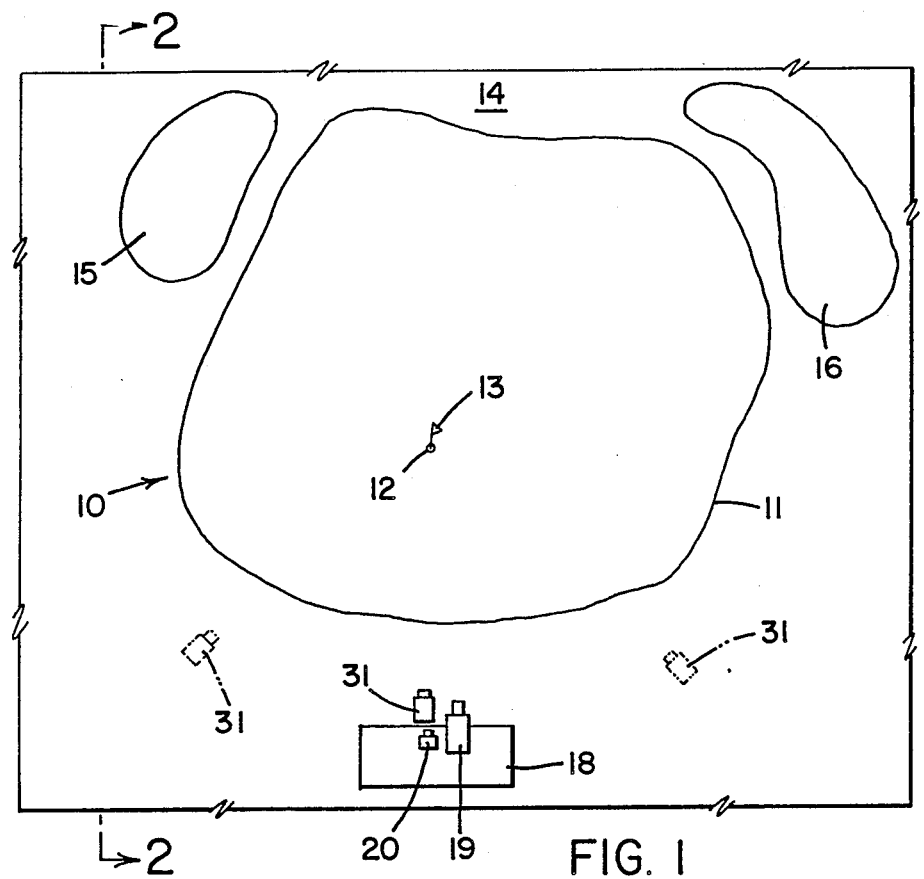
FIG. 1 is a top plan view of a typical golf green and immediately surrounding area depicted schematically the positioning of various equipment to record the contour and broadcast play at the hole.
Figure 2:
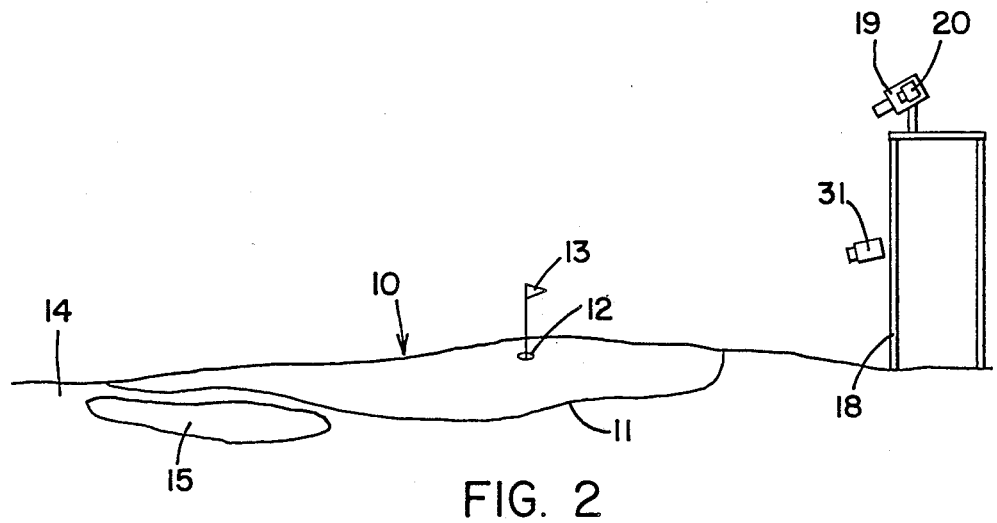
FIG. 2 is a side elevation of the hole, taken substantially along line 2—2 of FIG. 1.

With reference to the drawings, a typical golf green indicted generally by the numeral 10, is presented in FIG. 1. The green 10 contains a peripheral edge 11 and a hole 12 with a flag 13. In the approach area 14, sand traps 15 and 16 may appear, typically in front of hole 12.

In order to broadcast play of the hole, a television tower 18 is usually erected prior to the tournament in a location least likely to interfere with play and yet favorable for capturing the action. Position of the tower is determined by the crew and does not comprise a critical element of the invention but rather, it is to be understood that presence of the tower can be utilized for practice of the method because it is already there. The tower 18 is provided with at least one television camera depicted schematically by the numeral 19.

Figure 10:
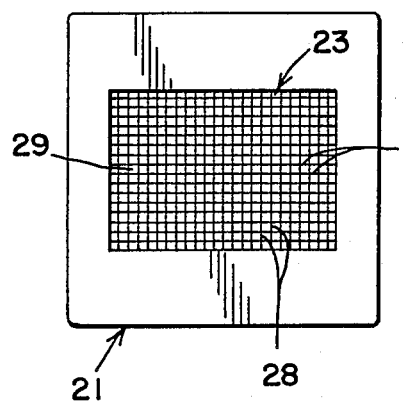
FIGS. 10 and 11 depict two photographic slides, containing square and rectangular grid screens, of the type which would be employed in conjunction with practice of the method of the present invention.
Figure 11:
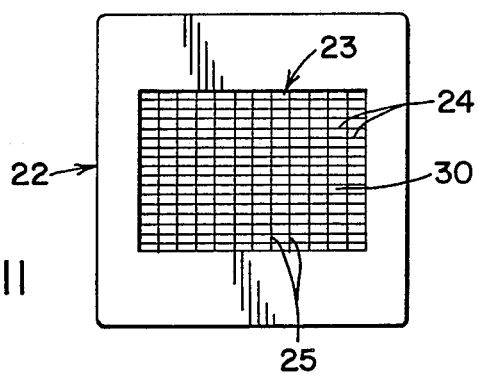

As briefly summarized hereinabove, the method is practiced by providing a grid pattern of intersecting horizontal and vertical lines onto the golf green from a point above the ground and preferably from one side. One relatively simple means of doing so is by utilizing a slide projector, depicted schematically by the numeral 20. As will be explained hereinbelow, the projector 20 is preferably mounted at or near the same perspective of the television camera 19. In practice, the crew will have a collection of slides such as 21 and 22 with different grid screens, 23 (FIGS. 10 and 11). The horizontal lines 24 of slide 22 are spaced closer together than are the vertical lines 25, in order to reduce the projected areas along the flat areas of green 10. In other situations, slide 21 may prove to be more useful wherein horizontal lines 26 and vertical lines 28 are equally spaced, presenting squares 29 therebetween rather than rectangles 30, depicted on slide 22. Still other slides (not shown) will be provided in the collection with various grids 23 having different line spacings depending on the size of the green 10.

The dimensions of squares 29 and rectangles 30 can be widely varied depending upon the projection distances and the resolution required to depict the contours. Thus, no attempt shall be made to suggest specific dimensions and it is to be understood that the method of the present invention shall not be limited thereby.

The slides can be prepared to cast a lighter grid pattern than the green 10 for contrast although with the correct lighting, contours may be enhanced with a darker grid pattern, relative to the green, or certainly a contrasting color e.g, yellow, onto the green normally illuminated. Generally, lighter grid patterns would be preferred for night recording although the green 10 can readily be illuminated by artificial lights 31 which can be positioned from the tower 18 or elsewhere on the green, as depicted in phantom in FIG. 1. As should also be appreciated lights 31 can provide colors to enhance contrast, as well as filters (not shown). Similarly, the projector 20 can be filtered and, as is known in the art, a collection of various focal length lenses can be employed to obtain the best resolution of contour for a given green.

Thus, once the equipment and crew are in place, it is a relatively simple matter to determine the best projection of a grid pattern, indicated generally by the numeral 32 in FIG. 4, to depict the contour of the green and then record it. Recording can be done via the television camera 19 i.e. video, or additionally still shots can be taken with suitable equipment not shown. It is also contemplated herein that the projector 20 can be moved about during projection of the grid pattern 32 in order to enhance minor changes in contour. Accordingly, it would be preferred to make a video recording of the moving grid pattern for subsequent use. The crew may also elect to record the contour as portrayed by several different grid patterns by using more than one slide. In this manner, the contours may be more clearly depicted relative to the position of the ball on the green.

With reference to FIGS. 3 and 4, the final result of the method shall be discussed. First in FIG. 3, the camera 19 is presenting the green 10 as it appears on a television screen 33. A ball 34 is on the green 10, away from the hole 12, separated by what appears to be a flat surface. Although the viewer has an appreciation for the relative distance, he is unable to tell very much about the contour and must be guided by the commentator. At this point the pre-recorded grid pattern 32 of this green can be mixed with the view presented in FIG. 3. When the former has been superimposed, the viewer can readily discern a small hump 35, between the ball and the hole as well as a rise 36, running somewhat diagonally therebetween. Due to the relative distortions of the grids pattern in the regions 34 and 36, the viewer readily understands the contours presented to the player.

During actual play, the optimum grid pattern can be selected to enhance the ground between a particular ball or location and the hole. Thus, enhancement of the play may be further facilitated by the selection and use of more than one grid pattern, which can be "frozen" from the prior video recording or selected from a collection of "still" shots. In either instance, it should be recognized that one view may be more appropriate at a specific location than one that is perhaps clearer from another location. It will also be understood that the relative size of the grid pattern may be varied to optimize presence of a contour variation. Thus, a balance is to be reached between a grid pattern that is too open to register a variation and a pattern that is so tight that it may obscure or confuse.

Figure 5:
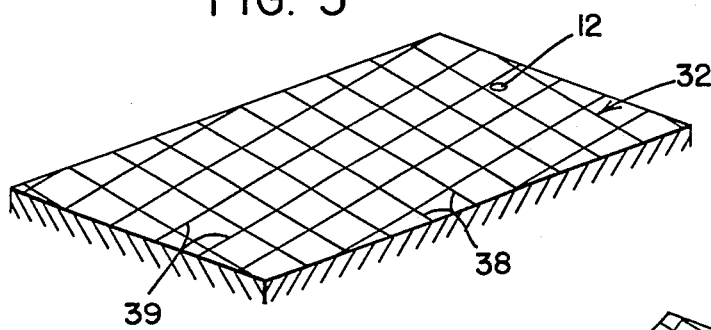
FIGS. 5-9 depict selected areas of land as might be presented by a golf green in which the contours have been enhanced according to the method of the present invention.
Figure 6:
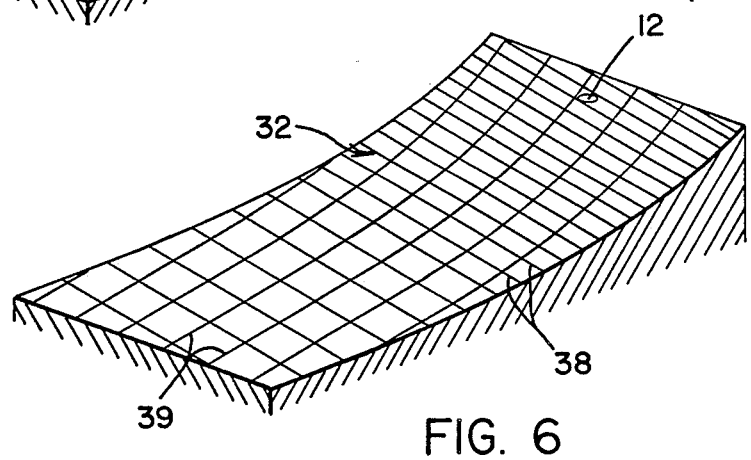
Figure 7:
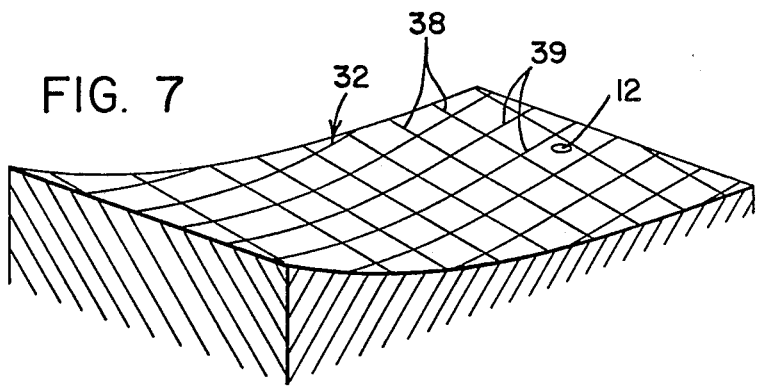
Figure 8:
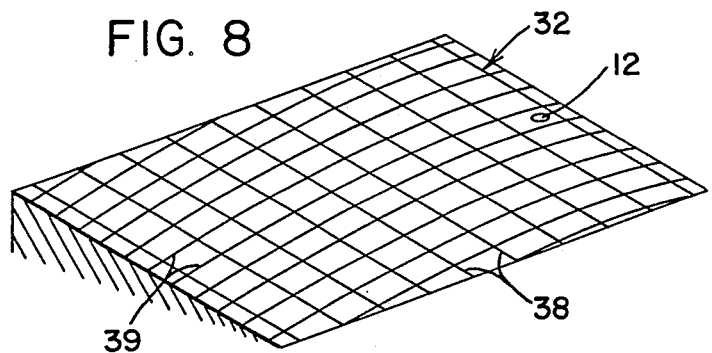
Figure 9:
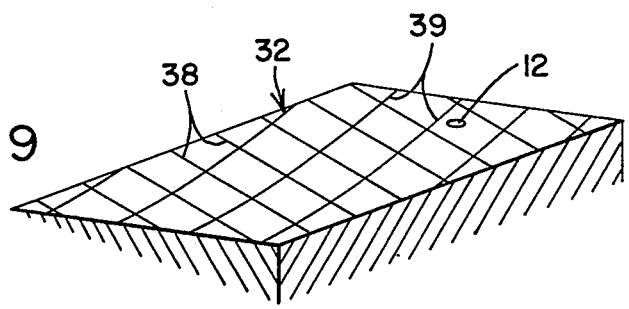

It will be appreciated that no two greens will be alike and thus, the presentation of the grid pattern 32 will appear differently with various contours. With reference to FIG. 5, a flat surface will present an even grid pattern 32. In a situation where the hole is uphill from the player, the grid pattern 32 will appear as in FIG. 6, while for a downhill situation, the grid pattern will appear as in FIG. 7. Finally grid patterns where the hole is leaning right or leaning left are depicted in FIGS. 8 and 9, respectively. While the patterns do not appear exactly the same, it should be evident that the curvature, proximity and possible distortion of the horizontal and vertical grid lines 38 and 39 will give clues to the viewer about the break of the green. Viewing experience, coupled with the guidance of the commentator and subsequent movement of the ball will provide the viewer with a presentation as good as or better than that observed by a direct spectator.

It should be understood that the foregoing method could also be utilized as a block or window, separate on the screen 33 from the unaided view in FIG. 3 and it can be combined with the use of a light pen (not shown) by the commentator for further explanation. It should now be evident that the method disclosed herein does not interfere with the player nor, does it obstruct the viewer's experience.

In conclusion, it should be apparent that the method of the present invention satisfies the foregoing objects by providing a relatively simple to use and understand means to enhance the broadcast of a golf tournament and, in particular, the play during putting. Of course, the foregoing method is not necessarily limited to golf tournaments and can just as readily be set up for the broadcast of other events such as skiing, as well as non-sporting events which may be encountered in various training activities.

Moreover, although the method has been exemplified by the use of projection systems and video cameras, it is within the skill of the art to employ other means, such a lasers, to project the required grid patterns 32. Similarly, computers may be employed to aid with the storage and selection of grid 23 and grid patterns 32. Thus, practice of the present invention is not limited solely to the description of the preferred embodiment.

It is, therefore, to be understood that any variations evident fall within the scope of the claimed invention and that the selection, placement and utilization of specific equipment as well as the optional method steps can be determined without departing from the spirit of the invention herein disclosed and described. Moreover, the scope of the invention shall include all modifications and variations that may fall within the scope of the attached claims.

What is claimed is:

1. A method for enhancing golf green contours for television broadcasts comprising the steps of:
   providing a first grid pattern of intersecting parallel lines over the surface of a golf green, whereby contours presented by the golf green distort the position and appearance of said first grid pattern to produce a second grid pattern different from said first;
   recording said second grid pattern; and
   broadcasting said second grid pattern onto a television screen simultaneously with the broadcast of said golf green during play thereon, whereby contours presented by the green are more clearly depicted by said second grid pattern; wherein said step of providing includes the steps of
   illuminating a transparency containing a grid screen to provide a first grid pattern of lines; and
   projecting said first grid pattern of lines onto said golf green from a position thereabove.

2. A method, as set forth in claim 1, including the additional steps of
   illuminating said golf green with a light source separate from the source of illumination for said transparency; and
   filtering at least one of said light source or said source of illumination in a manner to increase the resolution of said contours depicted by said second grid pattern.

3. A method, as set forth in claim 1, including the additional steps of
   selecting from a plurality of transparencies having different grid screens a specific transparency that is appropriate to depict the contours of said golf greens.

4. A method, as set forth in claim 3, wherein said step of providing includes the step of
   creating said first grid pattern from a laser source.

5. A method, as set forth in claim 1, wherein said step of recording includes the step of scanning said second grid pattern with a video camera recorder.

6. A method, as set forth in claim 5, including the additional steps of
   moving said first grid pattern slowly over said golf green, causing the continual distortion of the intersecting lines thereof as they encounter contours said green.

7. A method, as set forth in claim 1, including the additional steps of
   providing additional different grid patterns of intersecting parallel lines over the surface of said green, whereby contours presented by said golf green distort the position and appearance of said additional grid patterns to provide additional sets of altered grid patterns;
   recording said altered grid patterns; and
   selecting the most appropriate altered grid pattern to depict the contours between the location of a player's ball and the hole on the green for said step of broadcasting.

8. A method, as set forth in claim 1, wherein said step of recording is conducted photographically.

9. A method, as set forth in claim 1, wherein said step of broadcasting includes the step of superimposing said second grid pattern over the broadcast of said golf green during play.

10. A method, as set forth in claim 1, wherein said step of broadcasting includes the step of providing said second grid pattern in a split screen fashion or window on said television screen separate from the broadcast of said golf green.

11. A method for enhancing land contours for video viewing thereof comprising the steps of:
    providing a first grid pattern of intersecting parallel lines over the surface of a desired area of land, whereby contours presented by the land distort the position and appearance of said first grid pattern to produce a second grid pattern different from said first; and
    broadcasting said second grid pattern onto a screen surface whereby contours presented by the land are more clearly depicted by said second grid pattern; wherein said step of providing includes the steps of
    illuminating a transparency containing a grid screen to provide a first grid pattern of lines; and
    projecting said first grid pattern of lines onto said land from a position thereabove.

12. A method for enhancing golf green contours for television broadcasts comprising the steps of:
    providing a first grid pattern of intersecting parallel lines over the surface of a golf green, whereby contours presented by the golf green distort the position and appearance of said first grid pattern to produce a second grid pattern different from said first;
    recording said second grid pattern; and
    broadcasting said second grid pattern onto a television screen simultaneously with the broadcast of said golf green during play thereon, whereby contours presented by the green are more clearly depicted by said second grid pattern;

13. A method for enhancing land contours for video viewing thereof comprising the steps of:
    providing a first grid pattern of intersecting parallel lines over the surface of a desired area of land, whereby contours presented by the land distort the position and appearance of said first grid pattern to produce a second grid pattern different from said first; and
    broadcasting said second grid pattern onto a screen surface whereby contours presented by the land are more clearly depicted by said second grid pattern.

* * * * *